United States Patent [19]

Engl et al.

[11] 3,908,041

[45] Sept. 23, 1975

[54] PROCESS OF MANUFACTURING AN ELECTRICAL RESISTIVE ELEMENT

[75] Inventors: Alfred Engl; Kurt Marth; Peter Stoever, all of Regensburg, Germany

[73] Assignee: Siemens Aktiengesellschaft, Berlin & Munich, Germany

[22] Filed: Nov. 15, 1973

[21] Appl. No.: 415,958

[30] Foreign Application Priority Data

Nov. 20, 1972 Germany ........................... 2256770

[52] U.S. Cl. ..................... 427/101; 427/122; 156/4

[51] Int. Cl.[2] ............................................ C09C 1/44

[58] Field of Search........ 117/226, 229, 213, 106 R; 156/24, 4; 338/308

[56] References Cited

UNITED STATES PATENTS 3,447,872 11/1969 Amick ............................... 117/213

3,511,727 5/1970 Hays ................................. 117/213

*Primary Examiner*—Cameron K. Weiffenbach

*Assistant Examiner*—Charles R. Wolfe, Jr.

*Attorney, Agent, or Firm*—Hill, Gross, Simpson, Van Santen, Steadman, Chiara & Simpson

[57] ABSTRACT

A method of producing carbon resistors wherein a silicon oxide carrier member is subjected to the action of a reaction gas capable of etching the carrier member and pyrolytically depositing elemental carbon thereon. The reaction gas acts on the carrier member in an enclosed chamber and under controlled pressure-temperature conditions and may comprise a mixture of a thermally decomposable fluoro-carbon compound and an inert carrier gas. Additional hydrocarbons may also be added.

9 Claims, 1 Drawing Figure

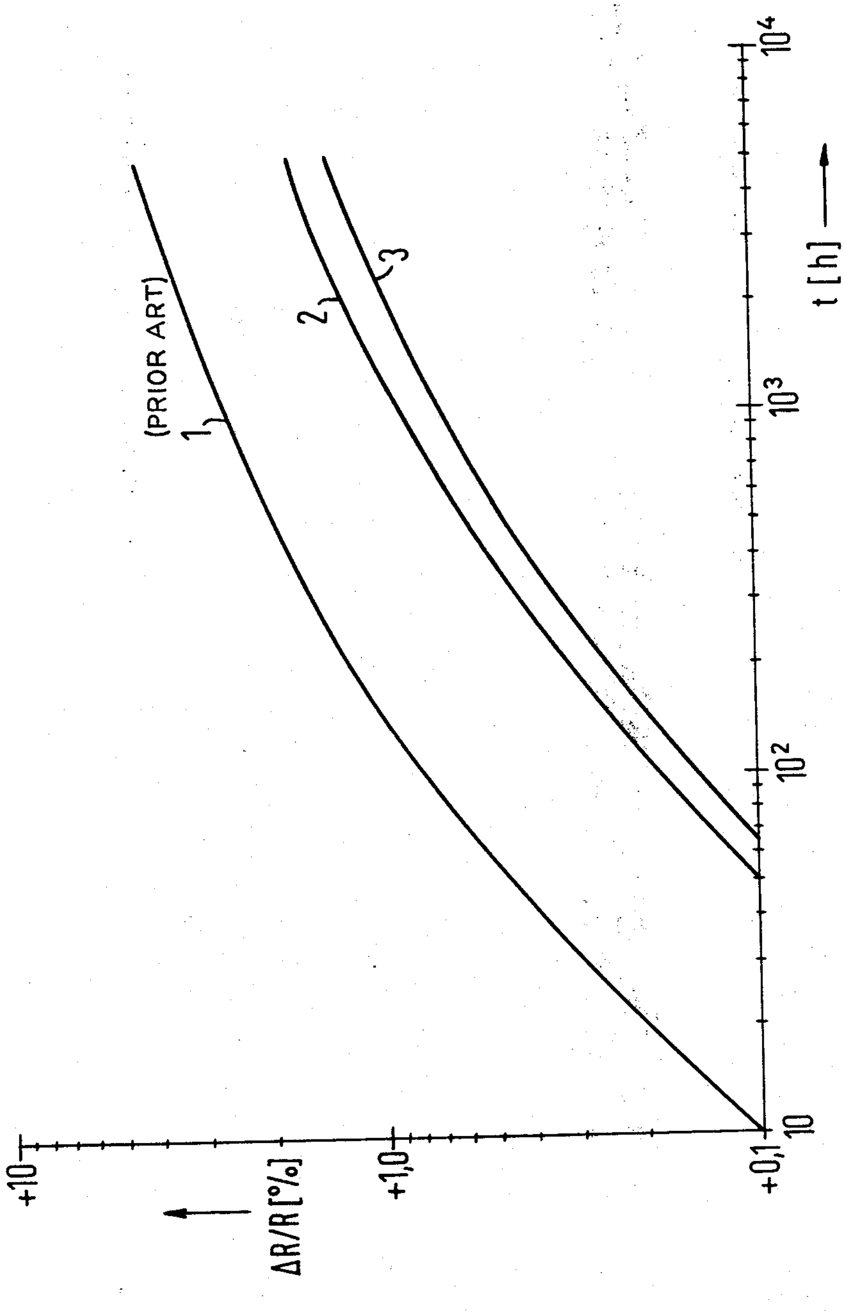
+10
+1,0
+0,1
ΔR/R [%]
10
10^2
10^3
10^4
t [h]
(PRIOR ART)
1
2
3

PROCESS OF MANUFACTURING AN ELECTRICAL RESISTIVE ELEMENT

BACKGROUND OF THE INVENTION

1. Field of the Invention

The invention relates to a process of manufacturing an electrical resistive element and somewhat more particularly to a process of manufacturing a conductive carbon film on a dielectric substrate composed of a silicon-containing material.

2. Prior Art

Methods of producing a conductive film composed of elemental carbon on an inorganic insulating silicon-containing substrate are known. Electrical terminals are attached to opposite ends of such a film to provide a functional element. Generally, such methods comprise cleansing the surface of the substrate, preparing the surface for deposition, as by wet-etching and then exposing the prepared surface to a reaction gas capable of pyrolytically depositing elemental carbon under conditions such that a firmly adhering film of elemental carbon is produced on a substrate. For example, such a method is described in German Auslegeschrift No. 1,119,975. In this publication, a preliminary treatment of hard porcelain substrates for achieving lustrous carbon film resistors comprises wet-etching with a buffered hydrofluoric acid solution. With this type of etching of a silicon oxide containing insulating substrate, which is preferably a ceramic, the surface thereof is firmly bonded to the pyrolytically produced carbon film and has substantial mechanical strength. This process is said to insure that the carbon film does not peel away from the substrate under mechanical stresses, which would destroy the resistor. However, etching of a substrate with aqueous hydrofluoric acid solutions has many serious drawbacks, including:

a. it is extremely difficult to achieve uniform etching of a complete surface area of ceramic substrates in a given operation;

b. frequently excessive etching takes place and causes poor long-term maintenance of the desired characteristics of a finished resistor element and/or the conductive film thereon, under warm storage conditions and/or under a load;

c. the ceramic substrates are exposed to uncontrolled contamination between the etching and the carbon deposition process and, in the event of protracted periods of time between these steps, to a deactivation of the surfaces being treated;

d. the variable treatment that aqueous hydrofluoric acid imparts to surfaces of a substrate affects their characteristics and the speed of pyrolysis (deposition), which is a form of a heterogeneous, surface-catalyzed gas reaction, which tends to prevent attainment of a uniform thickness in the deposited carbon film.

SUMMARY OF THE INVENTION

The invention provides a process which substantially overcomes the above prior art drawbacks and includes subjecting a substrate surface to a reaction gas containing a fluoro-carbon compound under select pressure-temperature conditions so that the pyrolysis products of the fluoride-containing carbon compound etch the substrate surface and immediately thereafter pyrolytically deposit elemental carbon on the etched surfaces.

In preferred embodiments, the reaction gas comprises a mixture of a carrier gas, such as $N_2$ and a fluoro-carbon compound selected from the group consisting of perfluorohexane ($C_6F_{14}$), perfluoroheptane ($C_7F_{16}$), perfluoropentane ($C_5F_{10}$), carbon tetrafluoride ($CF_4$) and mixtures thereof, a hydrocarbon such as heptane, propane, etc. and the pyrolysis conditions include temperatures of about 900° C. to 1000° C.

BRIEF DESCRIPTION OF THE DRAWING

The single FIGURE is a graphical illustration helpful in explaining certain advantageous results obtained from the practice of the invention in comparison with the prior art.

DESCRIPTION OF PREFERRED EMBODIMENTS

The invention provides an economical and contamination-free process of producing carbon films on silicon-containing substrates.

In accordance with the principles of the invention, a carbon film is deposited on a silicon-containing substrate surface from a fluoro-carbon compound. The temperature of the substrate and/or the composition of a reaction gas and/or the gas pressure are chosen on the basis of the components so that the pyrolysis products of the fluoro-carbon compound etch the substrate surface and immediately thereafter the deposition of elemental carbon takes place on such heated surfaces without the substrate contacting any oxidizing medium, such as air.

An important advantage of the invention is that the etching of a substrate and the deposition of a carbon film thereon can occur in immediate succession within the same reaction housing. Further, the costs incurred with the heretofore available processes that resulted from the separate operations required are completely avoided.

The invention allows the discard of etching with aqueous hydrofluoric acid and provides a gaseous etching process which occurs substantially simultaneously with or immediately prior to the start of a carbonization process by pyrolytical decomposition of fluorinated hydrocarbons. As an exemplary embodiment, an initial fluorinated hydrocarbon may comprise perfluorohexane ($C_6F_{14}$). Typical reactions which occur, for example, with perfluorohexane and silicon-dioxide substrates at carbonization temperatures of about 900° to 1000° C. are as follows:

$$7\,SiO_2 + 2\,C_6F_{14} \rightarrow 7\,SiF_4 + 10\,CO + 2\,CO_2 \quad (I)$$

$$7\,SiO_2 + 2\,C_6F_{14} + C_3H_8 \rightarrow 7\,SiF_4 + 14\,CO + C + 4\,H_2 \quad (II)$$

Reaction (I) above illustrates the initial etching resulting from the pyrolytic products prior to commencement of actual carbonization i.e. while the actual carbonization agent is still absent; while reaction (II) illustrates the reaction attained during etching when a hydrocarbon (such as propane, illustrated above) is present.

The invention substantially eliminates the above described prior art drawbacks and includes the following overall advantages:

1. the etching process is associated with the carbonization process and simply involves the cost of an etching medium;

2. the etching process is essentially self-regulating, at least insofar as areas of the surface which have been adequately etched or activated for carbon deposition (once an area has been activated, carbon begins to deposit thereon and protect it from further attack) so that over-etching is avoided and provides more favorable characteristics for long-term maintenance of desired resistor characteristics and provides a closer tolerance in the quality of the resultant resistors;

3. contamination, deactivation and confusion in the time lapse between etching and carbonation steps are eliminated;

4. the reliability of the carbonization steps in terms of a desired surface resistance is no longer dependent upon two distinct processes which are associated in an indeterminate manner and is therefore considerably improved.

Resistors produced by the practice of the invention are characterized by an extremely good long-term stability. For example, the behavior of carbon film resistors (resistance of 500 kΩ) after a total of 5000 hours of heat stress at 125° C. will be improved, as may be deduced from the graphical illustration in the drawing. The results shown are for three groups of resistors which differ only in their pre-carbonization treatment. The resistors represented by curve 1 were etched in a known manner, using an aqueous hydrofluoric acid solution and exhibited a 4.7% resistance change. The resistors represented by curve 2 were pyrolytically etched with the reagents set forth under (I)(A)(*b*) in Table 1 below and exhibited only a 1.8% resistance change. The resistors formed with reagents (I)(A)(*a*) and (I)-(A)(*c*) showed identical long-term stability. The resistors represented in curve 3 were carbonized without etching and exhibited the smallest amount of resistance change under hot storage conditions but tended to fail when subjected to various light mechanical stresses, for example, as occur during installation, since the carbon film peels away from the substrate.

Control of reactions (I) and (II) above may be achieved by changing the composition of the reaction gas. For example, simply by using different temperatures and/or pressures with the reactive gas in accordance with the differences in boiling point and/or vapor pressure between the etching and carbonization agents. In this manner, one is able to first produce a desired etching and then a desired carbon deposition.

Preferably, the reaction gas contains at least one pyrolytically decomposable fluoro-carbon compound having the general formula $C_nF_x$ wherein $n$ is a whole integer and $x$ is equal to $2n$ or $2n + 2$. Of these, preferred fluoro-carbon compounds are selected from the group consisting of perfluorohexane ($C_6F_{14}$), perfluoroheptane ($C_7F_{16}$), perfluoropentane ($C_5F_{10}$), carbon tetrafluoride ($CF_4$) and mixtures thereof. The reaction gas may also contain a carrier gas, such as nitrogen or another inert gas, along with a select hydrocarbon, such as heptane, propane, proponal-2, etc.

Exemplary embodiments of reaction gas compositions useful in the practice of the invention are set forth in Table I below. All of these gases provide the requisite reaction with silicon-containing substrates at normal pressures in a carbonization housing (so-called normal pressure carbonization) and under vacuum within the housing. Preferably, the vacuum ranges between about $10^{-1}$ to $10^{+1}$ mm Hg. It will be understood that in the following tabulations, nitrogen or another inert gas may be used as a carrier gas, even if not specifically mentioned.

TABLE 1

| Carbonizing Agent | | Etching Agent: A - Liquid | Etching Agent: B - Gaseous |
|---|---|---|---|
| I | Liquid | a) from separate supply means in a controlled sequence, for example, $C_7H_{16}$ and $C_6F_{14}$ (D, S) | a) from separate supply means in a controlled sequence, for example, $C_7H_{16}$ and $CF_4$ (D/J, S/J) |
| | | b) as a mixture having a largely uniform concentration, for example: an isopropyl alcohol containing <10% by volume of $C_6F_{14}$ (D, S) | b) etching agent is fed in a requisite quantity through a carbonizing agent and then additional amounts of carbonizing agent are fed into the pyrolysis housing in a carrier gas, for example: $C_7H_{14}$, $CF_4$, $N_2$. (D/J) |
| | | c) as a mixture, with an initially increased output of an etching agent, using gaps in mixing, specific weight and/or azeotropic distillation, for example, an isopropyl alcohol solution containing >10% by volume of $C_6F_{14}$. (D) | |
| II | Gaseous | a) from separate supply means in a controlled sequence, for example, propane and $C_6F_{14}$. (D/J, S/J) | a) from separate supply means in a controlled sequence, for example, propane and $CF_4$. (J) |
| | | b) carbonizing agent is fed through a requisite quantity of etching agent and transports this into the pyrolysis housing, for example, propane and $C_6F_{14}$. (D/J) | |

(D) = vaporized from a supply.
(S) = injected into pyrolysis housing by a pump.
(J) = injected at super atmospheric pressure into pyrolysis housing as a gas from a supply.

The features of the invention will be readily apparent from the following descriptions of certain preferred method embodiments taken in conjunction with the accompanying drawing.

EXAMPLE 1

The ceramic substrate, the composition of which comprises

37% $SiO_2$
49% $Al_2O_3$
2% MgO
2% BaO
2% CaO
remainder $TiO_2$, $ZrO_2$, $Fe_2O_3$, SrO is heated in a tube of fused quartz up to 980° C (± 10° C).

The tube is evacuated to 0.5 torr. 1 ml $C_6F_{14}$ is evaporized and within 8 minutes transported through the evacuated tube. Afterwards the substrate is carbonized by 5 ml propanol-2. After cooling the substrate is removed and treated as usual.

EXAMPLE 2

15,000 cylindrical ceramic substrates (diameter 4.2 mm, length 14 mm), the composition of which comprises 56% $SiO_2$
32% $Al_2O_3$
4% $ZrO_2$
remainder MgO, BaO, CaO, $Fe_2O_3$ are heated in a reaction tube of fused quartz up to 940° C (± 10°C). The tube is evacuated to 0.8 torr, which pressure will be maintained during the whole carbonization. First 1 ml of a mixture comprising 10% $C_6F_{14}$ and 90% propanol -2 is vaporized and transported within 30 minutes through the evacuated tube, followed by 1 ml pure propanol -2, which is also vaporized and transported within 33 minutes through the tube. Afer cooling the substrates are removed and manufactured to 500 kΩ-resistors.

The long-time-behavior of these resistors is shown by curve 2 of the drawing.

EXAMPLE 3 shows a carbonization at atmospheric pressure. Ceramic substrates, the composition of which comprises 58% $SiO_2$
5% $Al_2O_3$
30% MgO
remainder BaO, CaO, $ZrO_2$, $Fe_2O_3$ is heated in a reaction tube of fused quartz up to 1020° C (± 10°C). 5 ml $C_6F_{14}$ is vaporized and transported through the tube within 15 minutes by means of $N_2$-carrier gas. Afterwards for 2 hours a mixture comprising $N_2$ and propane is transported through the tube. The Flow rate is 480 l/h for $N_2$ and
20 l/h for propane.

After carbonization the substrates are cooled, removed and manufactured as usual.

Although particular embodiments of the invention have been described and illustrated herein, it is recognized that modifications and variations may readily occur to those skilled in the art and consequently it is intended that the claims be interpreted to cover such modifications and equivalents.

We claim as our invention:

1. A process of manufacturing an electrical resistive element comprised of a conductive film composed of elemental carbon deposited by thermal decomposition of a hydrocarbon gas on a substrate, said substrate composed of an inorganic dielectric silicon-dioxide containing ceramic, the process comprising:

cleansing select surfaces of said substrate, and subjecting the cleansed surfaces to the action of a reaction gas containing a pyrolytically decomposable fluoro-carbon compound having the general formula:

$$C_nF_x$$

wherein $n$ is a whole integer and $x$ is equal to $2n$ or $2n+2$, under pressure-temperature conditions conducive to a reaction between decomposition products of said fluoro-carbon compound and said silicon-dioxide ceramic so as to etch said cleansed surfaces and immediately thereafter deposit elemental carbon on said etched surfaces without exposing said surfaces to any oxidizing medium between the etching and the carbon deposition steps.

2. A method as defined in claim 1 wherein said fluoro-carbon compound is selected from the group consisting of perfluorohexane, perfluoroheptane, perfluoropentane, carbon tetrafluoride and mixtures thereof, and said reaction gas includes a carrier gas.

3. A method as defined in claim 2 wherein said fluoro-carbon compound is perfluorohexane and said cleansed surfaces are heated to a temperature in the range of about 900° to 1000° C. until elemental carbon is deposited thereon.

4. A method as defined in claim 2 wherein said carrier gas comprises $N_2$.

5. A method as defined in claim 1 wherein said reaction gas includes a sufficient amount of a hydrocarbon selected from the group consisting of propanol-2, propane and heptane to deposit elemental carbon on etched areas of the substrate surfaces and protect the same from further etching.

6. A method as defined in claim 1 wherein said reaction gas is formed by passing a gaseous fluorocarbon through a liquid carbonizing agent.

7. A method as defined in claim 1 wherein said reaction gas is formed by passing a gaseous hydrocarbon through a liquid fluorocarbon.

8. A method as defined in claim 1 wherein said reaction gas is formed by vaporizing a fluorocarbon compound and a hydrocarbon compound and mixing said vaporized compounds, and controlling the composition of such reaction gas so that it initially contains a larger amount of the fluorocarbon compound.

9. A process of manufacturing an electrical resistive element comprised of a film of elemental carbon on a substrate composed of a silicon-dioxide containing ceramic, comprising:

cleansing select surfaces of said substrate, forming a reaction gas containing a mixture of a pyrolytically decomposable fluoro-carbon compound selected from the group consisting of perfluorohexane, perfluoroheptane, perfluoropentane, carbon tetrafluoride and mixtures thereof, a hydrocarbon selected from the group consisting of propanol-2, propane, and heptane and nitrogen, and subjecting said cleansed surfaces to the action of said reaction gas under pressure-temperature conditions sufficient for a pyrolytic reaction to occur between pyrolysis products of said fluoro-carbon compound and said silicon-dioxide ceramic so as to form a silicon-fluoride layer on said surfaces and immediately thereafter pyrolytically deposit elemental carbon on said silicon-fluoride layer without exposing such layer to any oxidizing medium.

* * * * *